United States Patent
Rocci et al.

(10) Patent No.: US 10,789,493 B1
(45) Date of Patent: Sep. 29, 2020

(54) AIRSPACE REGULATION ENFORCEMENT VIA CONNECTED VEHICLES

(71) Applicant: Ford Global Technologies, LLC, Dearborn, MI (US)

(72) Inventors: Benjamin M. Rocci, Ann Arbor, MI (US); Derrick Portis, Southgate, MI (US); Mark Anthony Rockwell, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/584,282

(22) Filed: Sep. 26, 2019

(51) Int. Cl.
  *G08G 1/123* (2006.01)
  *G06K 9/00* (2006.01)
  *H04W 4/46* (2018.01)
  *G08G 5/00* (2006.01)
  *H04W 4/021* (2018.01)

(52) U.S. Cl.
  CPC ....... *G06K 9/00825* (2013.01); *G06K 9/0063* (2013.01); *G08G 5/0026* (2013.01); *G08G 5/0073* (2013.01); *H04W 4/021* (2013.01); *H04W 4/46* (2018.02)

(58) Field of Classification Search
  None
  See application file for complete search history.

(56) References Cited

U.S. PATENT DOCUMENTS

| | | | |
|---|---|---|---|
| 10,217,002 B2 | 2/2019 | Chan et al. | |
| 10,586,462 B1* | 3/2020 | Stein | G08G 5/006 |
| 2017/0092138 A1* | 3/2017 | Trundle | G08B 25/14 |
| 2019/0333292 A1* | 10/2019 | Chan | B60L 3/12 |
| 2019/0347924 A1* | 11/2019 | Trundle | B60L 53/30 |
| 2020/0099441 A1* | 3/2020 | Stein | H04W 4/40 |

* cited by examiner

*Primary Examiner* — Julie B Lieu
(74) *Attorney, Agent, or Firm* — Michael Spenner; Brooks Kushman PC

(57) ABSTRACT

A server includes a processor, programmed to responsive to receiving a first message indicative of detection of a flying object from a first vehicle, notify a second vehicle to detect the flying object, responsive to receiving a second message indicative of detection of the flying object from the second vehicle, calculate a location including a coordinate and an altitude of the flying object using the first message and the second message, and send a report including the location of the flying object to a predefined entity, wherein the first message includes a location of the first vehicle, a first time stamp, and a first angle of the object captured by a first camera against the horizon, and the second message includes a location of the second vehicle, a second time stamp, and a second angle of the object captured by a second camera against the horizon.

17 Claims, 3 Drawing Sheets

AIRSPACE REGULATION ENFORCEMENT VIA CONNECTED VEHICLES

TECHNICAL FIELD

The present disclosure generally relates to a system for detecting flying objects using vehicle cameras. More specifically, the present disclosure relates to detecting flying objects using connected vehicles.

BACKGROUND

Unauthorized flying objects (e.g., drones) may pose significant danger to aviation safety in restricted zones such as airports and their surrounding area. Enforcing airspace regulations, however, can be a challenging task to many authorities because those flying objects are usually not registered with authorities and may be too small to stand out on civilian aviation radars. Furthermore, many restricted airspaces may not have full radar coverage, making detections of the flying objects more difficult.

SUMMARY

In one or more illustrative embodiments of the present disclosure, a server includes a processor, programmed to responsive to receiving a first message indicative of detection of a flying object from a first vehicle, notify a second vehicle to detect the flying object, responsive to receiving a second message indicative of detection of the flying object from the second vehicle, calculate a location including a coordinate and an altitude of the flying object using the first message and the second message, and send a report including the location of the flying object to a predefined entity, wherein the first message includes a location of the first vehicle, a first time stamp indicative of a time of detection of the flying object by the first vehicle, and a first angle of the object captured by a first camera against the horizon, and the second message includes a location of the second vehicle, a second time stamp indicative of a time of detection of the flying object by the second vehicle, and a second angle of the object captured by a second camera against the horizon.

In one or more illustrative embodiments of the present disclosure, a method for a server includes receiving a first message indicative of detection of a flying object from a first vehicle, the first message including a vehicle location of the first vehicle, a first time stamp indicative of a time of detection of the flying object by the first vehicle, and a first angle of the object captured by a first camera of the first vehicle against the horizon; defining a geofence based on the vehicle location of the first vehicle; identifying a second vehicle located within the geofence; notifying a second vehicle to detect the flying object; receiving a second message indicative of detection of the flying object from the second vehicle, the second message including a vehicle location of the second vehicle, a second time stamp indicative of a time of detection of the flying object by the second vehicle, and a second angle of the object captured by a second camera against the horizon; and calculating a location including a coordinate and an altitude of the flying object using the vehicle location of the first vehicle, the first angle, the vehicle location of the second vehicle and the second angle.

In one or more illustrative embodiments of the present disclosure, a non-transitory computer-readable medium includes instructions that, when executed by a processor of a computer, cause the computer to receive a first message indicative of detection of a flying object via a first camera from a first vehicle, the first message including a vehicle location of the first vehicle, and a first angle of the object captured by the first camera against horizon; define a geofence based on the vehicle location of the first vehicle; identify a plurality of fleet vehicles located within the geofence; notify the plurality of fleet vehicles to detect the flying object; receive messages indicative of detection of the flying object from the second vehicle, each of the messages including a vehicle location of a respective fleet vehicle, and an angle against horizon of the object captured by a camera of the respective fleet vehicle; and calculate a location including a ground coordinate and an altitude of the flying object above the ground coordinate using the vehicle location of the first vehicle, the first angle, a plurality of locations and angles included in the plurality of messages.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
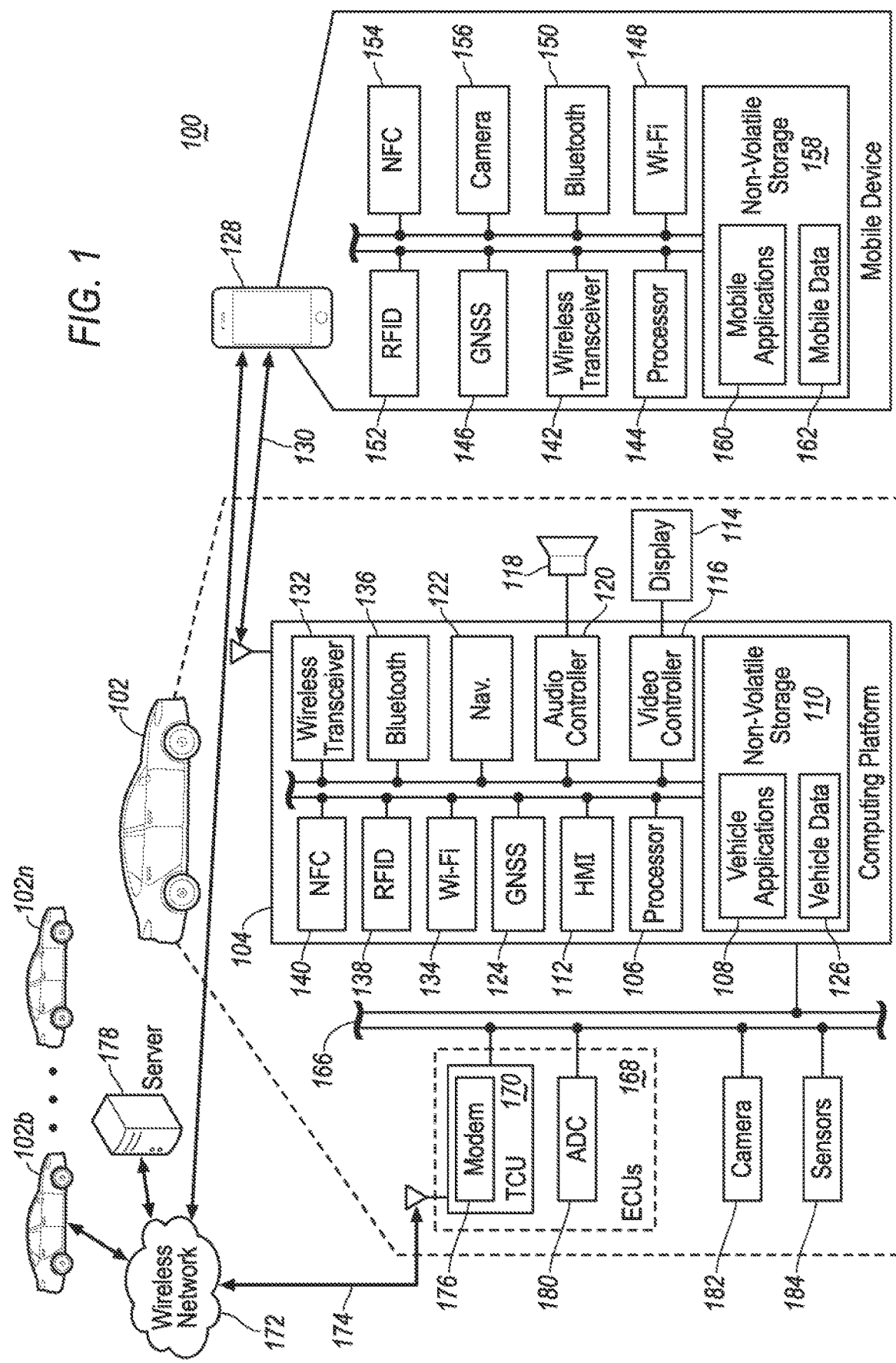
FIG. 1 illustrates an example block topology of a vehicle system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a system for detecting flying objects using vehicle cameras. More specifically, the present disclosure proposes a system for locate flying objects using multiple connected vehicles.

Vehicles are increasingly being built with forward facing cameras for lane detection and autonomous driving features. Those cameras may be used to detect moving objects above the horizon with help of software. Once a vehicle detects a flying object using a camera, the vehicle may report the detection to a server. The server may notify other similarly equipped vehicles in the area to look for and report the flying object. With the report from multiple vehicles in the area, the server may be able to estimate the location (including coordinates and altitude) of the flying object. Once the location has been estimated, this estimated location may be compared to a database of known/authorized air traffic in the area (similar altitude and coordinates). If there is no known/authorized activity in the area, images may be captured by the vehicle cameras and sent to a database along with the estimated location. Law enforcement authorities may then access this information via the database.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102a. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102a. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smartfobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, a ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller (not shown) and a GNSS controller 146. The mobile device 128 may be provided with a wireless transceiver 142 in communication with a Wi-Fi controller 148, a Bluetooth controller 150, a RFID controller 152, an NFC controller 154, and other controllers (not shown), configured to communicate with the wireless transceiver 132 of the computing platform 104. The mobile device 128 may be further provided with camera 156 configured to capture images. The mobile device 128 may be further provided with a non-volatile storage 158 to store various mobile application 160 and mobile data 162.

The computing platform 104 may be further configured to communicate with various components of the vehicle 102a via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102a configured to perform various options. For instance, the computing platform may be configured to communicate with a TCU 170 configured to control telecommunication between vehicle 102a and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities. The server 178 may be further configured to communicate with various fleet vehicles 102b . . . 102n via the wireless network 172. The ECUs 168 may further include an autonomous driver controller (ADC) 180 configured to provide autonomous driving features to the vehicle 102a. For instance, the autonomous driving feature may be enabled by the ADC 180 using image data captured by a camera 182 and proximity data from sensors 184. The camera 182 may be a forward facing camera configured to capture images ahead of the vehicle 102a. The sensors 184 may include various sensors configured to detect objects at a vicinity of the vehicle 102a. For instance, the sensors 184 may include a radar, a lidar, an ultra-sonic sensor or the like. With the camera 182 as well as sensors 184, the vehicle 102a may be provided with object detecting and image recognizing features using software as one of vehicle applications 108. Similarly, the fleet vehicles 102b . . . 102n are also provided with those features coordinated by the server 178.

Figure 2:
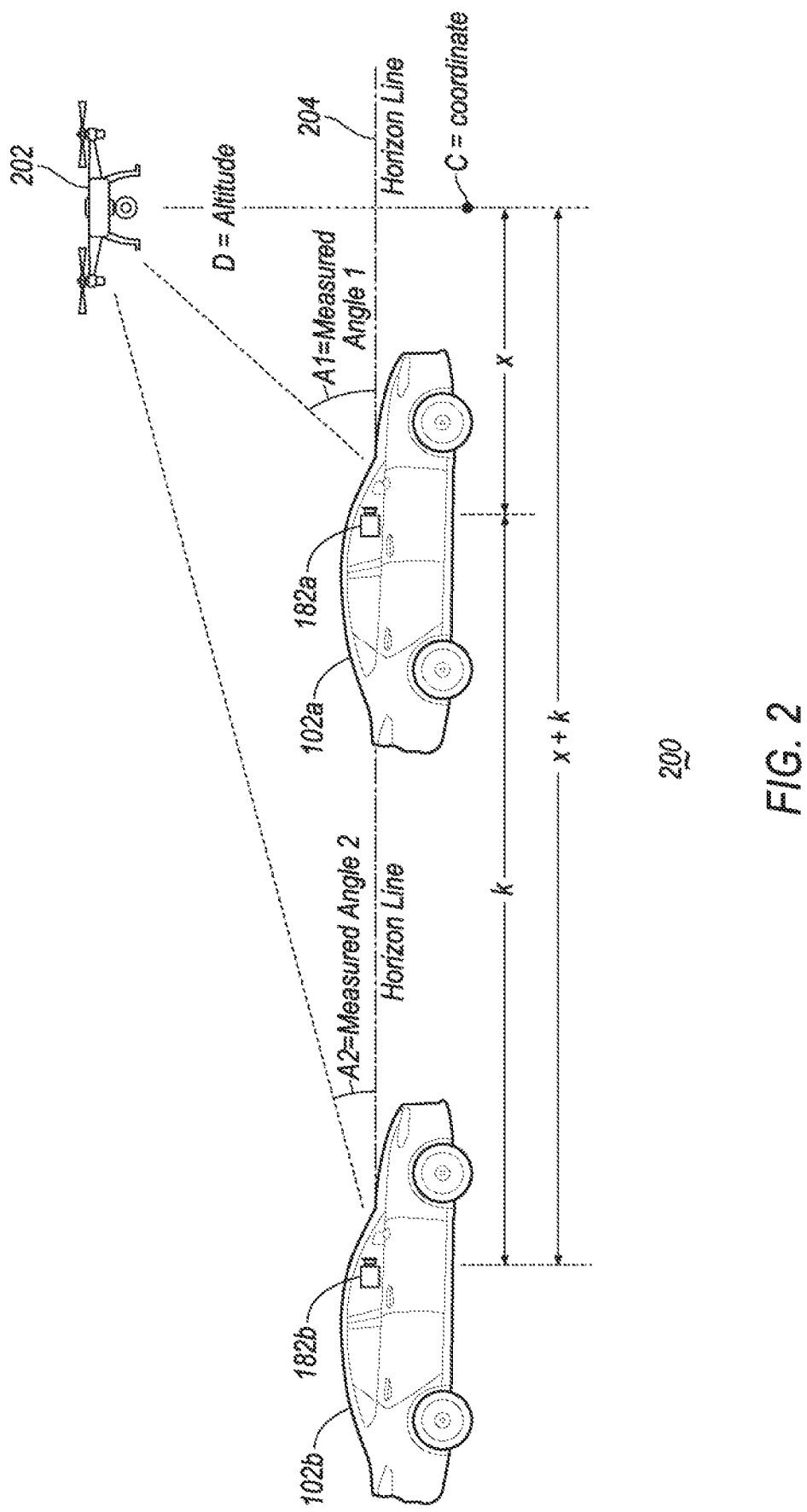
FIG. 2 illustrates an example schematic diagram of a location measurement for a flying object of one embodiment of the present disclosure.

Referring to FIG. 2, an example schematic diagram 200 of a location measurement for a flying object of one embodiment of the present disclosure is illustrated. In the present example, a flying object 202 such as a drone may be at a location defined by both a coordinate C indicative a point location on the ground and an altitude D indicative of a height above the coordinate C. To calculate the location of the flying object 202, at least two connected fleet vehicles 102 may be needed. As an example, the flying object 202 may be detected by a camera 128a of a first vehicle 102a and a camera 128b a second vehicle 102b. Alternatively, the camera 156 of the mobile device 128 of each vehicle 102 may be used to detect the flying object 202. The first vehicle 102a may measure a first angle A1 of the flying object 202 against the horizon line 204, and the second vehicle 102b may measure a second angle A2 of the flying object 202 against the horizon line 204. Since both vehicles 102a and 102b may be provided with locations features via a GNSS controller 124, location/coordinate of both vehicles may be reported by the server 178. Alternatively, the location data may be collected from the GNSS controller 146 of the mobile device associated with each respective vehicle 102. With the location of both vehicles 102a and 102b available, a distance k between the vehicles 102a and 102b may be calculated by the server 178. To determine the coordinate C of the flying object, a distance X from one of the fleet vehicles (i.e. the first vehicle 102a in the present example) may be calculated using the following equations:

$$\tan(A1)=D/X \quad (1)$$

$$\tan(A2)=D/(X+k) \quad (2)$$

Combining the above equations (1) and (2):

$$X*\tan(A1)=(X+k)*\tan(A2) \quad (3)$$

Therefore $$X = \frac{k*\tan(A2)}{\tan(A1)-\tan(A2)} \quad (4)$$

Since distance k between the vehicles 102, angle A1 measured by the first vehicle 102a and angle A2 measured by the second vehicle are known, the distance X can be calculated. Responsive to determining the distance X, the server 178 may calculate the altitude D of the flying object 202 using equation (1).

In the above example, it is assumed the first vehicle 102a and the second vehicle 102b are substantially in line with the coordinate C of the flying object 202. However, the location calculation may operate in a substantially same manner when the vehicles 102 are not aligned with the coordinate. Additionally, since the camera 182 is mounted on the windshield of the vehicles 102 in many cases, there may be a height between the horizon line 204 from the perspective of the camera 182 and the ground. Since, the height is usually small in most cases as the vehicle windshield is not high about the ground, the height between the horizon line 204 and the ground surface from which the altitude D is measured may ignored. Although the above example is illustrated and described using only two vehicles 102, it is noted that more vehicles may be used to provide a more accurate location calculation. Additionally, the vehicle 102 may be configured to measure a distance from the object 202 using sensors 184 in some instances. And the distance data measured by the vehicle 102 may be used to calculate the location of the flying object 202.

Figure 3:
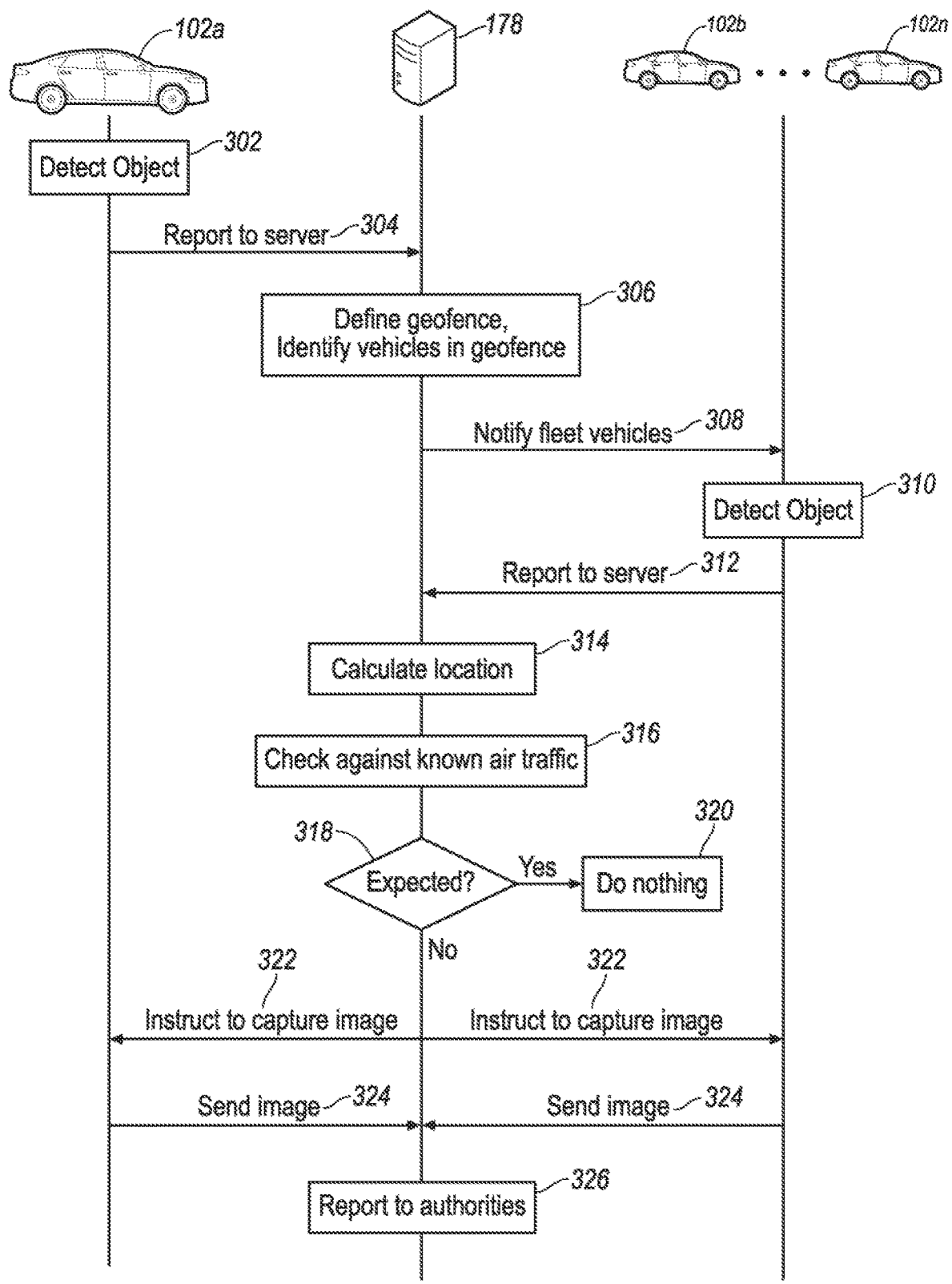
FIG. 3 illustrates an example flow diagram of the flying object location measurement of one embodiment of the present disclosure.

Referring to FIG. 3, an example flow diagram of a process for measuring a flying object of one embodiment of the present disclosure is illustrated. With continuing reference to FIGS. 1 and 2, at operation 302, the vehicle 102a detects a flying object 202 via the camera 182. In response, the vehicle 102a sends a detection report of the flying object 202 to the server 178 via the wireless network 172. The detection report may include various information, such as the location of the vehicle 102a from the GNSS controller 124, a timestamp of detection, the direction and measured angle of the flying objects 202 captured by the camera 182 or the like. Responsive to receiving the detection report from the vehicle 102a, the server 178 defines a geofence using the location of the vehicle 102a and identifies fleet vehicles 102 currently located within the geofence. The geofence may be defined using a predefined range (e.g. corresponding to a capture range of the camera 182) centered around the vehicle 102a. Additionally, the server 178 may take the vehicle heading and camera direction into account to define and adjust the geofence. Once the geofence is determined, the server 178 identifies one or more fleet vehicles 102 provided with the object detection feature to help locate the flying object 202 because the report from one vehicle may not be enough for location calculation.

Responsive to identifying one or more fleet vehicles 102 currently within the geofence, at operation 308, the server 178 notifies those fleet vehicles 102 as identified to detect and report the flying object 202. In the present example, assuming fleet vehicles 102b to 102n are identified within the geofence, responsive to receiving the notification from the server 178, the fleet vehicles 102b . . . 102n activate the cameras 182 and starts to detect the object 310 at operation 310. The notification from the server 178 may include a general direction/orientation for detection observed from the first vehicle 102a for easier detection by the fleet vehicles 102b . . . 102n. Responsive to detecting the flying object 202, one or more of the fleet vehicles 102b . . . 102n sends a detection report to the server 178 similar to the first vehicle 102 did previously. Responsive to receiving the detection report from at least two vehicles 102, at operation 314, the server 178 calculates the location of the flying objection 202 as described above with reference to FIG. 2. Since the flying object 202 may be moving as the detection takes place, detection reports received from multiple fleet vehicles 102 is preferably within a predefined short time frame (e.g. ten seconds) for detection accuracy. If time stamps of the records from different vehicles are beyond the predefined threshold, the server 178 may request the fleet vehicles 102 to repeat the detection process and send multiple detection reports to accurately estimate the location of the flying object 202.

At operation 316, responsive to determining an estimated location of the flying object 202, the server 178 checks the estimated location against a known air traffic database to verify if the flying object 202 as detected is authorized traffic. For instance, the flying object 202 be a flight taking off or landing at an airport. If the server 178 verifies the flying object 202 is authorized traffic, at operation 318, the process proceeds to operation 320. The server 178 marks the object 202 as authorized and the process ends without reporting. However, if the air traffic database does not include such traffic as detected indicating the flying object 202 is unauthorized, the process proceeds to operation 322 and the server 178 instructs the fleet vehicles 102 to capture an image of the object 202. At operation 324, the fleet vehicles 102 captures images as instructed and send the images to the server 178. At operation 326, the server 178 generates a complaint report including location and images of the flying object 202 and sends the report to aviation authorities.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A server comprising:
    a processor, programmed to
        responsive to receiving a first message indicative of detection of a flying object from a first vehicle, notify a second vehicle to detect the flying object,
        responsive to receiving a second message indicative of detection of the flying object from the second vehicle, calculate a location including a coordinate and an altitude of the flying object using the first message and the second message, and
        send a report including the location of the flying object to a predefined entity,
    wherein the first message includes a location of the first vehicle, a first time stamp indicative of a time of detection of the flying object by the first vehicle, and a first angle of the object captured by a first camera against the horizon, and the second message includes a location of the second vehicle, a second time stamp indicative of a time of detection of the flying object by the second vehicle, and a second angle of the object captured by a second camera against the horizon.

2. The server of claim 1, wherein the processor is further programmed to:
    define a geofence based on the first message from the first vehicle; and
    identify the second vehicle located within the geofence.

3. The server of claim 2, wherein the geofence is defined around the location of the first vehicle based on a predefined camera range.

4. The server of claim 3, wherein the processor is further programmed to:
    adjust the geofence based on a direction of the first camera at a time the flying object is captured.

5. The server of claim 1, wherein the processor is further programmed to:
    responsive to calculating the location of the flying object, verify the location of the flying object against authorized air traffic via a database.

6. The server of claim 5, wherein the processor is further programmed to:
    responsive to failing to find a match from the database indicative of the flying object is unauthorized, instruct the first vehicle and second vehicle to capture images of the flying object.

7. The server of claim 6, wherein the processor is further programmed to:
    receive images of the flying object, and
    incorporate the images of the flying object into the report.

8. The server of claim 1, wherein the processor is further programmed to:
    compare the first time stamp with the second time stamp, and
    responsive to a difference in time between the first time stamp and the second time stamp being greater than a predefined threshold, notify the first vehicle and the second vehicle to regenerate and send messages to the server.

9. A method for a server, comprising:
    receiving a first message indicative of detection of a flying object from a first vehicle, the first message including a vehicle location of the first vehicle, a first time stamp indicative of a time of detection of the flying object by the first vehicle, and a first angle of the object captured by a first camera of the first vehicle against the horizon;
    defining a geofence based on the vehicle location of the first vehicle;
    identifying a second vehicle located within the geofence;
    notifying a second vehicle to detect the flying object;
    receiving a second message indicative of detection of the flying object from the second vehicle, the second message including a vehicle location of the second vehicle, a second time stamp indicative of a time of detection of the flying object by the second vehicle, and a second angle of the object captured by a second camera against the horizon; and
    calculating a location including a coordinate and an altitude of the flying object using the vehicle location of the first vehicle, the first angle, the vehicle location of the second vehicle and the second angle.

10. The method of claim 9, further comprising:
verifying the location of the flying object against authorized air traffic via a database.

11. The method of claim 10, further comprising:
responsive to failing to find a match from the database indicative of the flying object is unauthorized, instructing the first vehicle and second vehicle to capture images of the flying object; and
receiving images of the flying objects from the first vehicle and the second vehicle.

12. The method of claim 11, further comprising:
generating a violation report including the location and images of the flying object; and
sending a violation report to a predefined entity.

13. The method of claim 9, further comprising:
adjusting the geofence based on a direction of the first camera at a time the flying object is captured.

14. The method of claim 9, further comprising:
comparing the first time stamp with the second time stamp, and
responsive to a difference between the first time stamp and the second time stamp being greater than a predefined threshold, notifying the first vehicle and the second vehicle to regenerate and send messages to the server.

15. A non-transitory computer-readable medium, comprising instructions, when executed by a processor of a computer, cause the computer to:
receive a first message indicative of detection of a flying object via a first camera from a first vehicle, the first message including a vehicle location of the first vehicle, and a first angle of the object captured by the first camera against horizon;
define a geofence based on the vehicle location of the first vehicle;
identify a plurality of fleet vehicles located within the geofence;
notify the plurality of fleet vehicles to detect the flying object;
receive messages indicative of detection of the flying object from the fleet vehicles, each of the messages including a vehicle location of a respective fleet vehicle, and an angle against horizon of the object captured by a camera of the respective fleet vehicle; and
calculate a location including a ground coordinate and an altitude of the flying object above the ground coordinate using the vehicle location of the first vehicle, the first angle, a plurality of locations and angles included in the messages.

16. The non-transitory computer-readable medium of claim 15, wherein the geofence is defined around the location of the first vehicle based on a predefined camera range.

17. The non-transitory computer-readable medium of claim 16, further comprising instructions that, when executed by the processor of the computer, cause the computer to:
adjust the geofence based on a direction of the first camera at a time the flying object is captured.

* * * * *